United States Patent
Yang et al.

(10) Patent No.: US 11,800,122 B2
(45) Date of Patent: Oct. 24, 2023

(54) VIDEO PROCESSING APPARATUS USING INTERNAL PREDICTION BUFFER THAT IS SHARED BY MULTIPLE CODING TOOLS FOR PREDICTION

(71) Applicant: MEDIATEK INC., Hsin-Chu (TW)

(72) Inventors: Chih-Wen Yang, Hsinchu (TW);
Chi-Hung Chen, Hsinchu (TW);
Kai-Chun Lin, Hsinchu (TW);
Chien-Wei Lin, Hsinchu (TW);
Meng-Jye Hu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/678,045

(22) Filed: Feb. 23, 2022

(65) Prior Publication Data

US 2023/0054524 A1 Feb. 23, 2023

Related U.S. Application Data

(60) Provisional application No. 63/233,831, filed on Aug. 17, 2021.

(51) Int. Cl.
| | | |
|---|---|---|
| *H04N 19/42* | (2014.01) |
| *H04N 19/423* | (2014.01) |
| *H04N 19/105* | (2014.01) |
| *H04N 19/127* | (2014.01) |
| *H04N 19/156* | (2014.01) |
| *H04N 19/172* | (2014.01) |
| *H04N 19/503* | (2014.01) |
| *H04N 19/593* | (2014.01) |
| *H04N 19/15* | (2014.01) |
| *H04N 19/85* | (2014.01) |

(52) U.S. Cl.
CPC ......... *H04N 19/423* (2014.11); *H04N 19/105* (2014.11); *H04N 19/127* (2014.11); *H04N 19/15* (2014.11); *H04N 19/156* (2014.11); *H04N 19/172* (2014.11); *H04N 19/503* (2014.11); *H04N 19/593* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 10,516,891 B2 * | 12/2019 | Lee | H04N 19/423 |
| 2008/0267295 A1 | 10/2008 | Sung | |
| 2012/0106862 A1 * | 5/2012 | Sato | H04N 19/523 382/233 |
| 2013/0329137 A1 * | 12/2013 | Mishra | H04N 5/91 348/714 |

(Continued)

*Primary Examiner* — Chikaodili E Anyikire
(74) *Attorney, Agent, or Firm* — Winston Hsu

(57) ABSTRACT

A video processing apparatus implemented in a chip includes an on-chip prediction buffer and a processing circuit. The on-chip prediction buffer is shared by a plurality of coding tools for prediction, and is used to store reference data. The processing circuit supports the coding tools for prediction, reads a plurality of first reference data from the on-chip prediction buffer as input data of a first coding tool that is included in the coding tools and enabled by the processing circuit, and writes output data of the first coding tool enabled by the processing circuit into the on-chip prediction buffer as a plurality of second reference data.

20 Claims, 10 Drawing Sheets

(56) References Cited

U.S. PATENT DOCUMENTS

| | | | |
|---|---|---|---|
| 2018/0103260 A1* | 4/2018 | Chuang | H04N 19/51 |
| 2019/0089976 A1* | 3/2019 | Huang | H04N 19/176 |
| 2021/0297693 A1* | 9/2021 | Chujoh | H04N 19/159 |
| 2021/0352313 A1* | 11/2021 | Takehara | H04N 19/44 |
| 2022/0201321 A1* | 6/2022 | Gao | H04N 19/117 |

* cited by examiner

VIDEO PROCESSING APPARATUS USING INTERNAL PREDICTION BUFFER THAT IS SHARED BY MULTIPLE CODING TOOLS FOR PREDICTION

CROSS REFERENCE TO RELATED APPLICATIONS

This application claims the benefit of U.S. provisional application No. 63/233,831, filed on Aug. 17, 2021 and incorporated herein by reference.

BACKGROUND

The present invention relates to a video processing design, and more particularly, to a video processing apparatus using an internal prediction buffer that is shared by multiple coding tools for prediction.

The conventional video coding standards generally adopt a block based coding technique to exploit spatial and temporal redundancy. For example, the basic approach is to divide the whole source picture into a plurality of blocks, perform intra/inter prediction on each block, transform residues of each block, and perform quantization and entropy encoding. Besides, a reconstructed picture is generated in a coding loop to provide reference pixel data used for coding following blocks. For certain video coding standards, in-loop filter(s) may be used for enhancing the image quality of the reconstructed picture. The video decoder is used to perform an inverse operation of a video encoding operation performed by a video encoder. For example, the video decoder may have a plurality of processing circuits, such as an entropy decoding circuit, an intra prediction circuit, a motion compensation circuit, an inverse quantization circuit, an inverse transform circuit, a reconstruction circuit, and in-loop filter(s).

The intra/inter prediction may have a lot of coding tools to improve prediction data accuracy. Ina conventional design, reference data needed by a coding tool for intra prediction are read from a large-sized off-chip memory such as a dynamic random access memory (DRAM). For example, input data of a first coding tool for intra prediction are read from a first dedicated storage area allocated in the DRAM, and output data of the first coding tool for intra prediction are written into the first dedicated storage area allocated in the DRAM for later use; and input data of a second coding tool for intra prediction are read from a second dedicated storage area allocated in the DRAM, and output data of the second coding tool for intra prediction are written into the second dedicated storage area allocated in the DRAM for later use. Furthermore, since reference data needed by intra prediction are stored in the DRAM, the intra prediction performance may be degraded due to the DRAM latency.

Thus, there is a need for an innovative design which is capable of reducing the reference data storage size and/or improving the processing latency and performance.

SUMMARY

One of the objectives of the claimed invention is to provide a video processing apparatus using an internal prediction buffer that is shared by multiple coding tools for prediction.

According to a first aspect of the present invention, an exemplary video processing apparatus implemented in a chip is disclosed. The exemplary video processing apparatus includes an on-chip prediction buffer and a processing circuit. The on-chip prediction buffer is shared by a plurality of coding tools for prediction, and is arranged to store reference data. The processing circuit is arranged to support the plurality of coding tools for prediction, read a plurality of first reference data from the on-chip prediction buffer as input data of a first coding tool that is included in the plurality of coding tools and enabled by the processing circuit, and write output data of the first coding tool enabled by the processing circuit into the on-chip prediction buffer as a plurality of second reference data.

According to a second aspect of the present invention, an exemplary video processing apparatus is disclosed. The exemplary video processing apparatus includes a prediction buffer and a processing circuit. The prediction buffer is shared by a plurality of coding tools for prediction, and is arranged to store reference data, wherein the prediction buffer is not a dynamic random access memory (DRAM). The processing circuit is arranged to support the plurality of coding tools for prediction, read a plurality of first reference data from the prediction buffer as input data of a first coding tool that is included in the plurality of coding tools and enabled by the processing circuit, and write output data of the first coding tool enabled by the processing circuit into the prediction buffer as a plurality of second reference data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
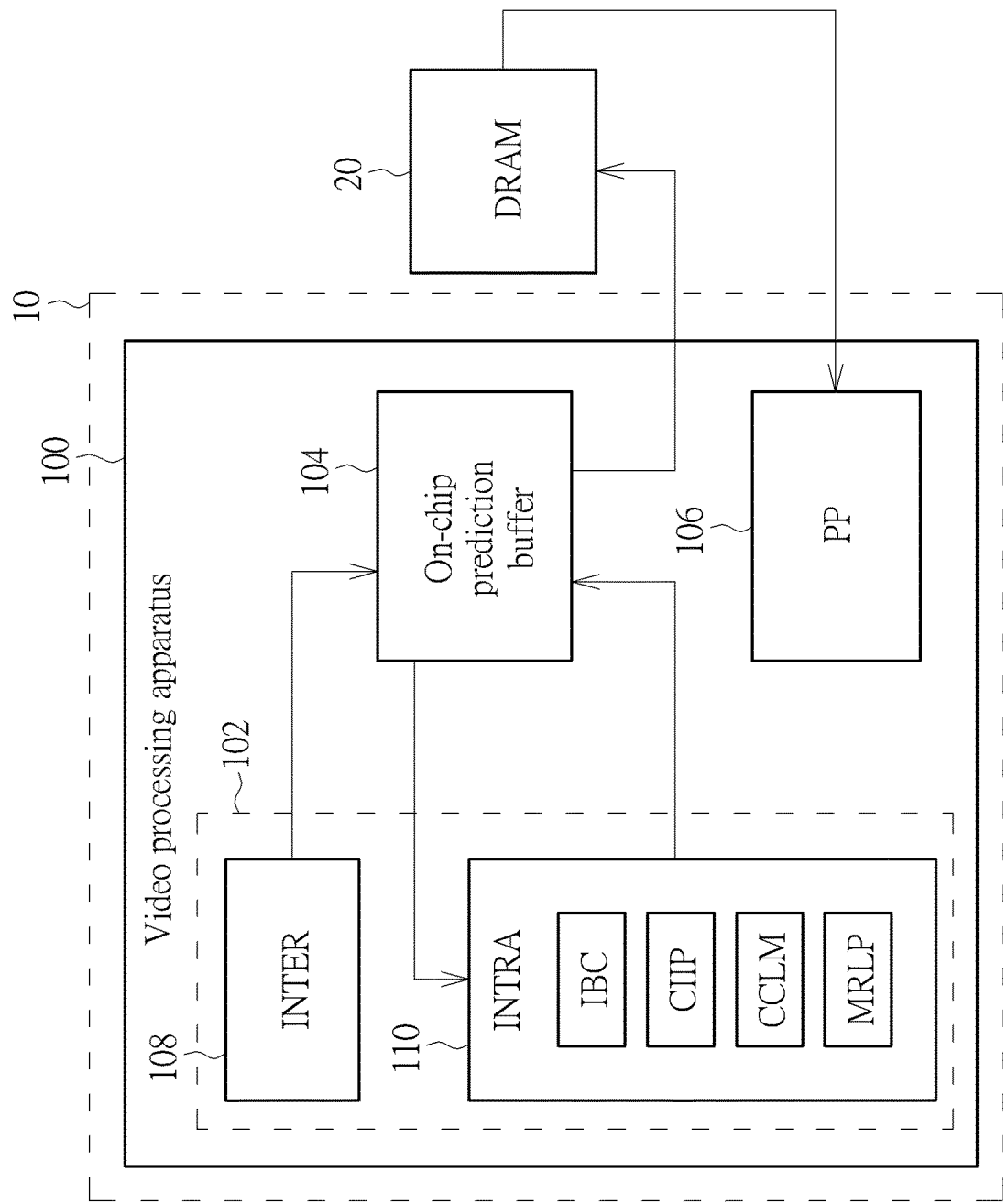
FIG. 1 is a diagram illustrating a first video processing apparatus according to an embodiment of the present invention.

FIG. 1 is a diagram illustrating a first video processing apparatus according to an embodiment of the present invention. The video processing apparatus 100 is implemented in a chip 10, and is coupled to an off-chip memory such as a dynamic random access memory (DRAM) 20. The video processing apparatus 100 may be a part of a Versatile Video Coding (VVC) encoder/decoder. However, this is for illustrative purposes only, and is not meant to be a limitation of the present invention. In practice, any video encoder/decoder using the architecture proposed by the present invention falls within the scope of the present invention. In this embodiment, the video processing apparatus 100 includes a processing circuit 102, an on-chip prediction buffer 104, and a post-processing circuit (labeled as "PP") 106. The processing circuit 102 includes an inter prediction module (labeled as "INTER") 108 and an intra prediction module (labeled as "INTRA") 110. The processing circuit 102 supports a plurality of coding tools for prediction. For example, intra prediction tools supported by the intra prediction module 100 may include two or more of intra block copy (IBC), combined inter intra prediction (CIIP), cross-component linear model (CCLM), and multiple reference line prediction (MRLP). In this embodiment, the processing circuit 102 may enable an intra prediction mode selected from an IBC mode, a CIIP mode, a CCLM mode, and an MRLP mode. IBC, CIIP, CCLM and MRLP are specified in the VVC coding standard. Since principles of IBC, CIIP, CCLM and MRLP are known to those skilled in the pertinent art, further description is omitted here for brevity.

The on-chip prediction buffer 104 is an internal buffer shared by multiple coding tools for prediction (e.g. IBC, CIIP, CCLM, and MRLP), and is arranged to store reference data. It should be noted that the on-chip prediction buffer 104 is not a DRAM. For example, the on-chip prediction buffer 104 may be implemented by a static random access memory (SRAM). Since the on-chip prediction buffer 104 is shared by multiple coding tools for prediction (e.g. IBC, CIIP, CCLM, and MRLP), the processing circuit 102 (particularly, intra prediction module 110 of processing circuit 102) is arranged to read a plurality of first reference data from the on-chip prediction buffer 104 as input data of a selected coding tool (e.g. one of IBC, CIIP, CCLM, and MRLP) enabled by the processing circuit 102 (particularly, intra prediction module 110 of processing circuit 102), and write output data of the selected coding tool (e.g. one of IBC, CIIP, CCLM, and MRLP) enabled by the processing circuit 102 (particularly, intra prediction module 110 of processing circuit 102) into the on-chip prediction buffer 104 as a plurality of second reference data.

Figure 2:
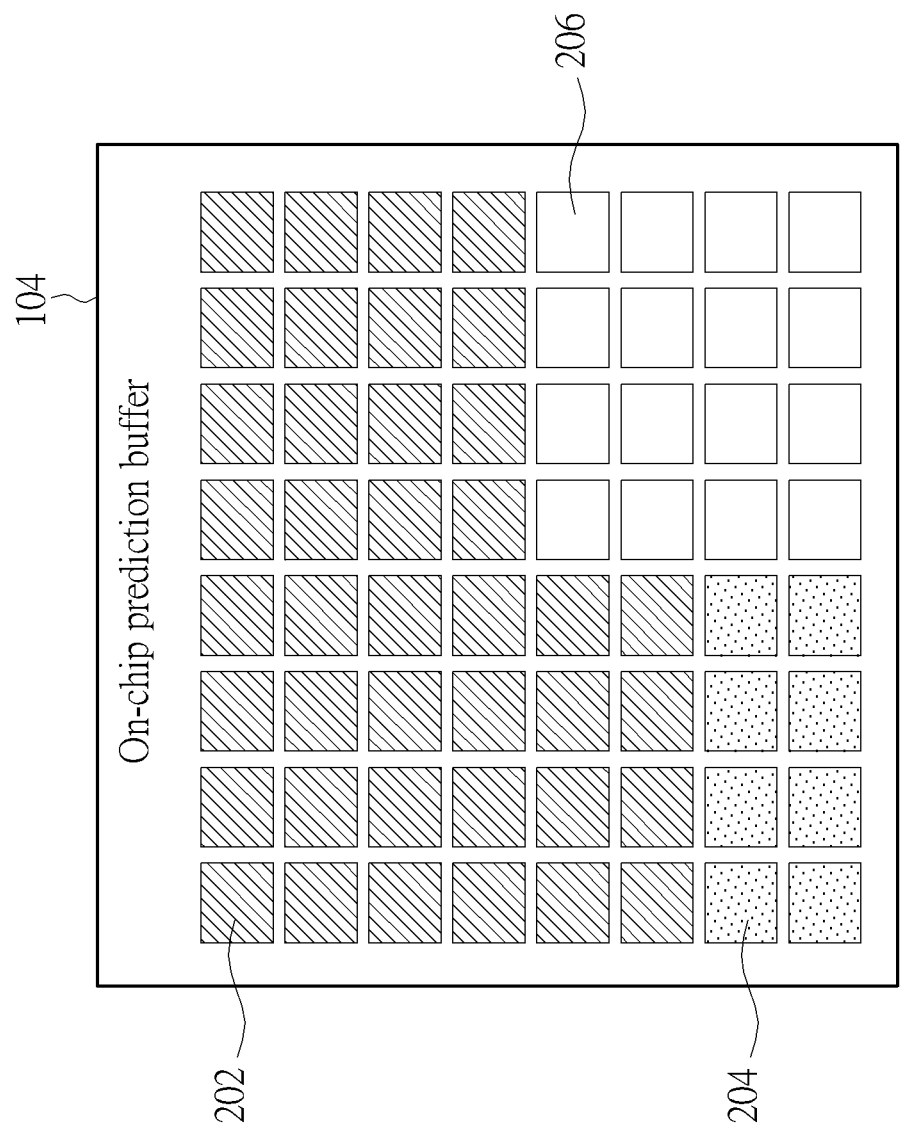
FIG. 2 is a diagram illustrating a footprint of the on-chip prediction buffer according to an embodiment of the present invention.

FIG. 2 is a diagram illustrating a footprint of the on-chip prediction buffer 104 according to an embodiment of the present invention. In this embodiment, the reference data stored in the on-chip prediction buffer 104 comprise prediction data (represented by blocks 202) and reconstructed data (represented by blocks 204). It should be noted that prediction data may be converted into reconstructed data by summing up the prediction data and corresponding residue data. The on-chip prediction buffer 104 may have unused areas (represented by blocks 206). For example, the prediction data (represented by blocks 202) may include intra prediction data (i.e. prediction data generated by intra prediction) and inter prediction data (i.e. prediction data generated by inter prediction). For another example, reconstructed data (represented by blocks 204) may include intra reconstructed data (i.e. reconstructed data generated under intra prediction mode) and inter reconstructed data (i.e. reconstructed data generated under inter prediction mode). When the intra prediction mode is set by CCLM, MRLP, or IBC, intra/inter reconstructed data are read from the on-chip prediction buffer 104 as input data of the intra prediction mode, and output data (reconstructed data) generated from the intra prediction mode are written into the on-chip prediction buffer 104. When the intra prediction mode is set by CIIP, intra/inter prediction data are read from the on-chip prediction buffer 104 as input data of the intra prediction mode, and output data (reconstructed data) generated from the intra prediction mode are written into the on-chip prediction buffer 104. For better understanding of technical features of the present invention, several examples of using the on-chip prediction buffer 104 to access (read/write) the reference data are given as below.

Figure 3:
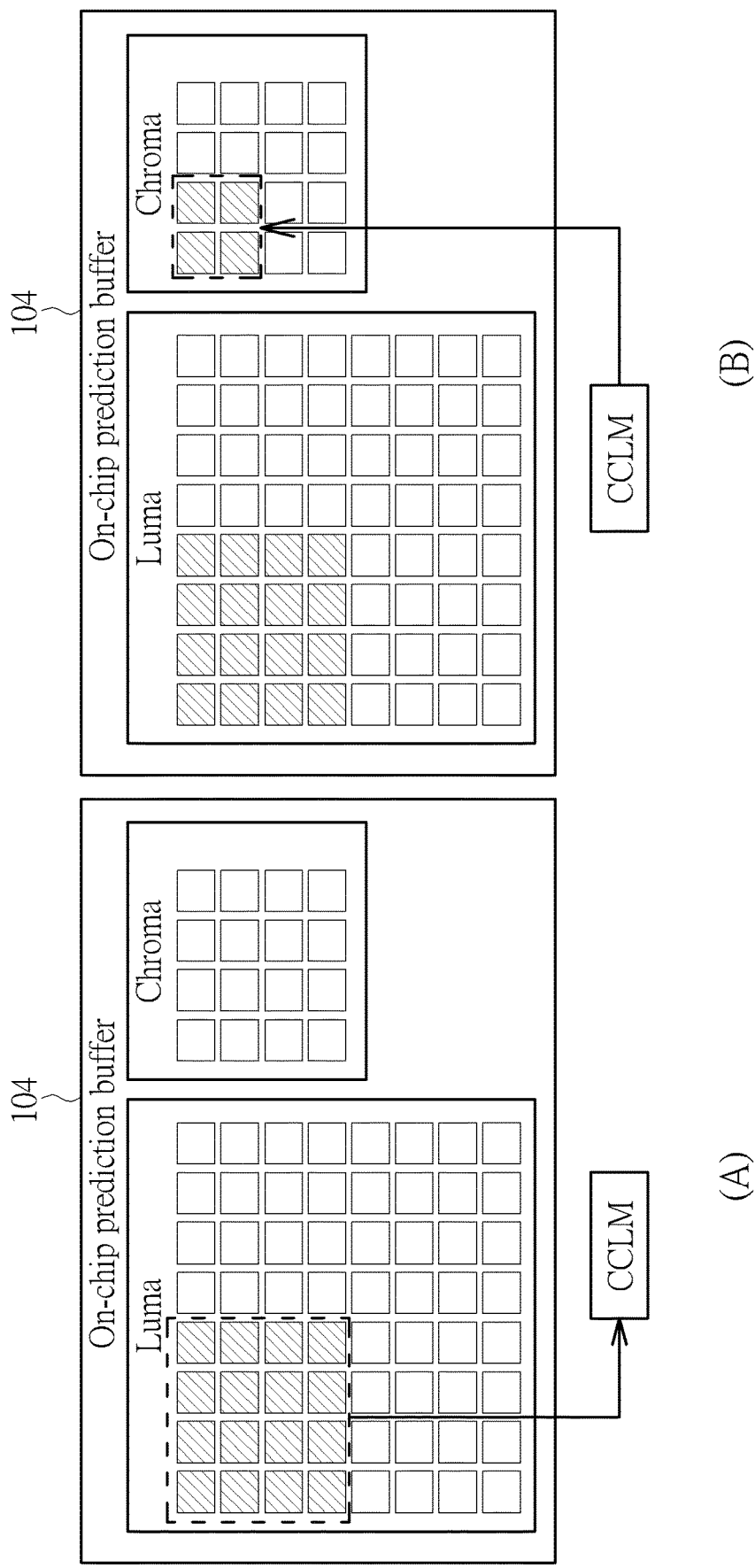
FIG. 3 is a diagram illustrating data transfer between the processing circuit and the on-chip prediction buffer under the CCLM mode according to an embodiment of the present invention.

FIG. 3 is a diagram illustrating data transfer between the processing circuit 102 and the on-chip prediction buffer 104 under the CCLM mode according to an embodiment of the present invention. As shown in sub-diagram (A) of FIG. 3, the processing circuit 102 (particularly, intra prediction module 110 of processing circuit 102) gets luma reconstructed data from the on-chip prediction buffer 104. Next, as shown in sub-diagram (B) of FIG. 3, the processing circuit 102 (particularly, intra prediction module 110 of processing circuit 102) applies downsampling to the luma reconstructed data to generate chroma reconstructed data, and writes the chroma reconstructed data into the on-chip prediction buffer 104.

Figure 4:
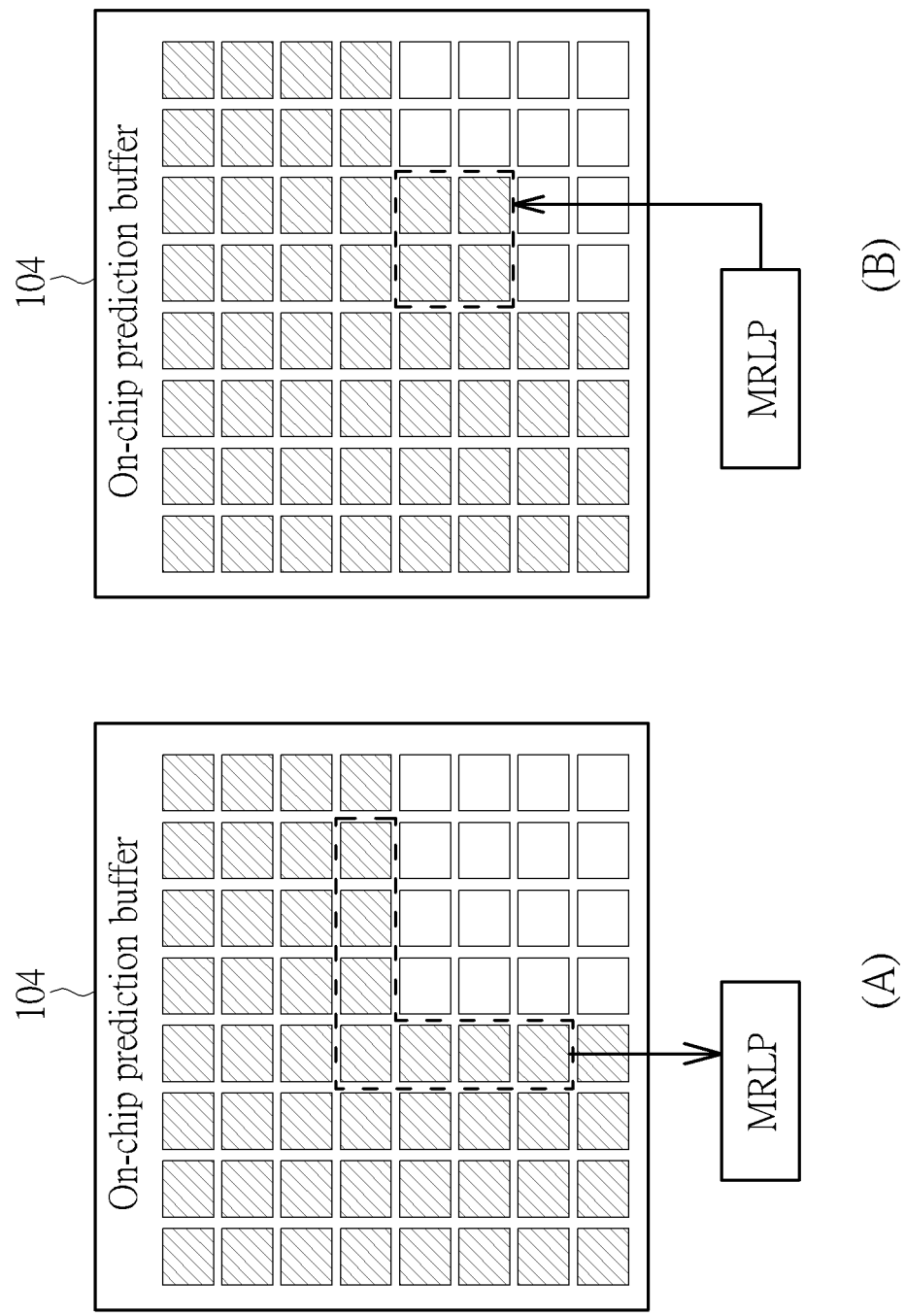
FIG. 4 is a diagram illustrating data transfer between the processing circuit and the on-chip prediction buffer under the MRLP mode according to an embodiment of the present invention.

FIG. 4 is a diagram illustrating data transfer between the processing circuit 102 and the on-chip prediction buffer 104 under the MRLP mode according to an embodiment of the present invention. Since the coding tool selected and enabled by the processing circuit 102 is MRLP, top and left neighbors of the current block are needed. The top and left neighbors of the current block are reconstructed data of previous blocks, and are stored in the on-chip prediction buffer 104. As shown in sub-diagram (A) of FIG. 4, the processing circuit 102 (particularly, intra prediction module 110 of processing circuit 102) gets reconstructed data of previous blocks from the on-chip prediction buffer 104. Next, as shown in sub-diagram (B) of FIG. 4, the processing circuit 102 (particularly, intra prediction module 110 of processing circuit 102) determines reconstructed data of the current block according to the reconstructed data of previous blocks, and writes the reconstructed data of the current block into the on-chip prediction buffer 104.

Figure 5:
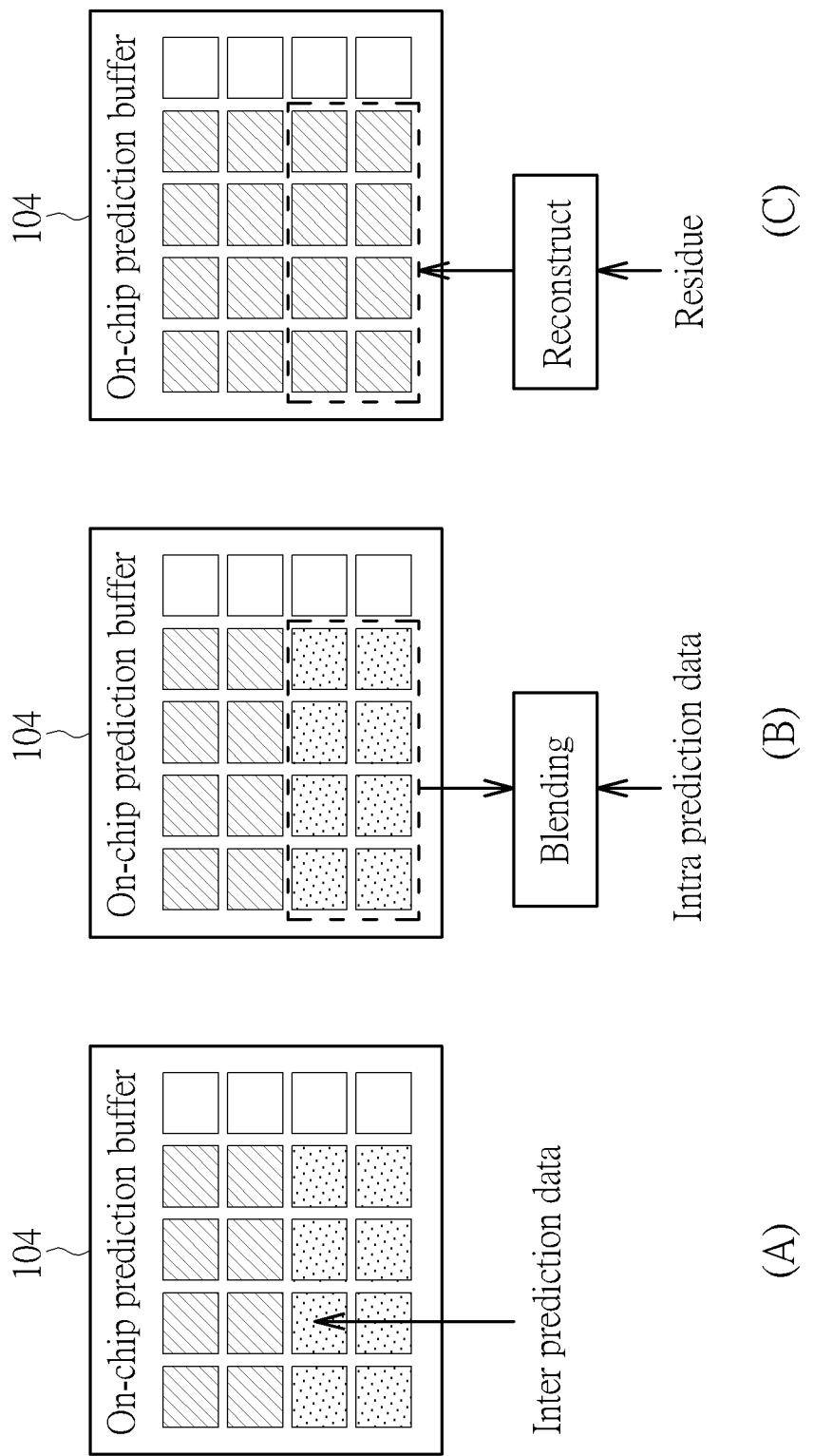
FIG. 5 is a diagram illustrating data transfer between the processing circuit and the on-chip prediction buffer under the CIIP mode according to an embodiment of the present invention.

FIG. 5 is a diagram illustrating data transfer between the processing circuit 102 and the on-chip prediction buffer 104 under the CIIP mode according to an embodiment of the present invention. The CIIP will do inter intra blending after completing inter prediction and intra prediction. Suppose that inter prediction data are ready first. As shown in sub-diagram (A) of FIG. 5, the processing circuit 102 (particularly, inter prediction module 108 of processing circuit 102) writes the inter prediction data into the on-chip prediction buffer 104, and waits for the intra prediction data. When the intra prediction data are ready, the processing circuit 102 (particularly, intra prediction module 110 of processing circuit 102) reads the inter prediction data from the on-chip prediction buffer 104, and blends the inter prediction data and the intra prediction data to generate final prediction data, as shown in sub-diagram (B) of FIG. 5. After inter intra blending is completed, the processing circuit 102 (particularly, an adder of processing circuit 102) adds the final prediction data to the corresponding residue data to generate reconstructed data as output data of CIIP, and writes the reconstructed data into the on-chip prediction buffer 104 at the same positions of the inter prediction data, as shown in sub-diagram (C) of FIG. 5. Specifically, the inter prediction data that are stored in the on-chip prediction buffer 104 and read from the on-chip prediction buffer 104 as input data of CIIP will be overwritten by the reconstructed data that are output data of CIIP. Hence, no extra storage space is occupied by the reconstructed data output from CIIP.

Figure 6:
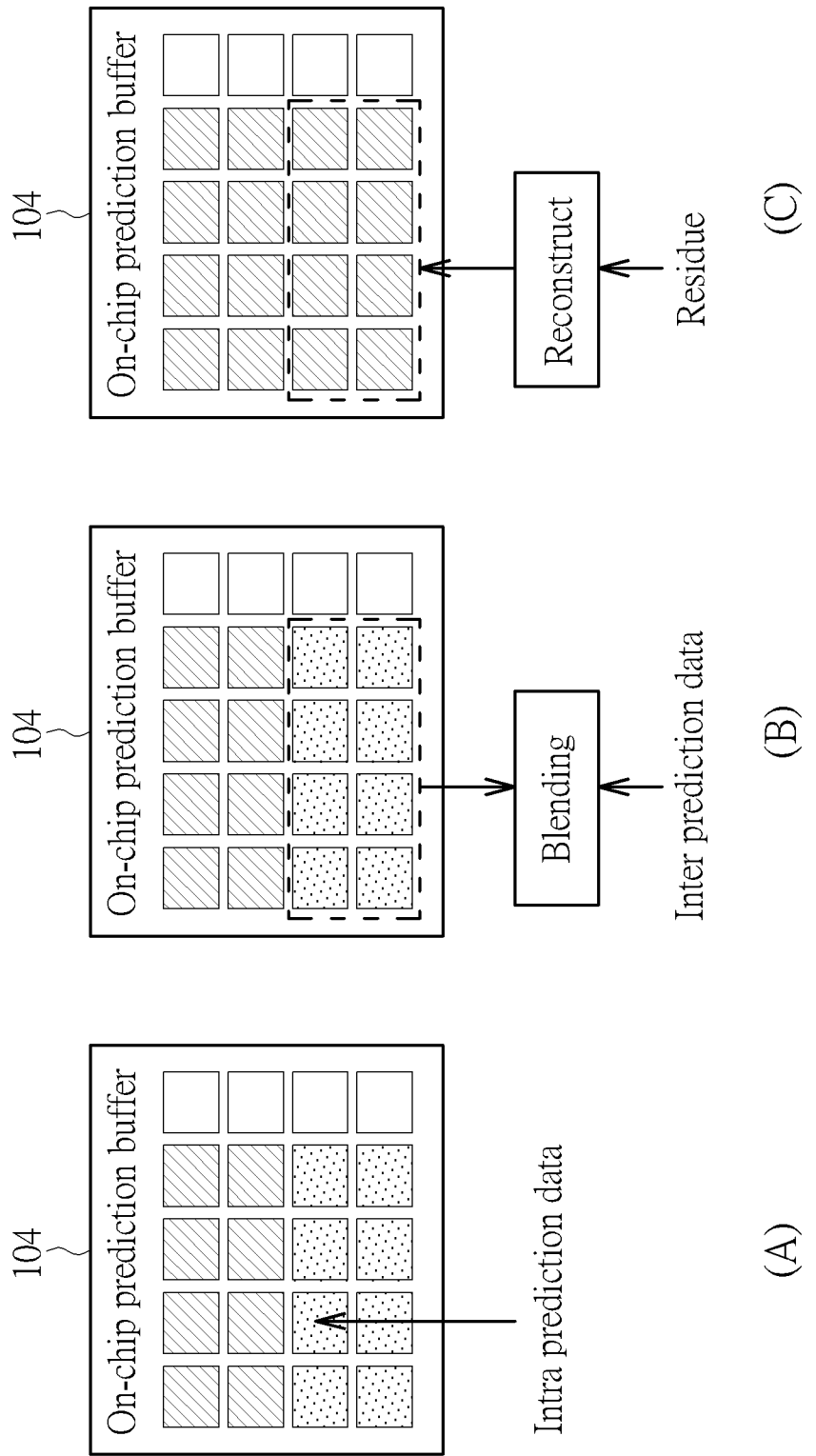
FIG. 6 is a diagram illustrating another data transfer between the processing circuit and the on-chip prediction buffer under the CIIP mode according to an embodiment of the present invention.

FIG. 6 is a diagram illustrating another data transfer between the processing circuit 102 and the on-chip prediction buffer 104 under the CIIP mode according to an embodiment of the present invention. The CIIP will do inter intra blending after completing inter prediction and intra prediction. Suppose that intra prediction data are ready first. As shown in sub-diagram (A) of FIG. 6, the processing circuit 102 (particularly, intra prediction module 110 of processing circuit 102) writes the intra prediction data into the on-chip prediction buffer 104, and waits for the inter prediction data. When the inter prediction data are ready, the processing circuit 102 (particularly, inter prediction module 108 of processing circuit 102) reads the intra prediction data from the on-chip prediction buffer 104, and blends the inter prediction data and the intra prediction data to generate final prediction data, as shown in sub-diagram (B) of FIG. 6. After inter intra blending is completed, the processing circuit 102 (particularly, an adder of processing circuit 102) adds the final prediction data to the corresponding residue data to generate reconstructed data as output data of CIIP, and writes the reconstructed data into the on-chip prediction buffer 104 at the same positions of the intra prediction data, as shown in sub-diagram (C) of FIG. 6. Specifically, the intra prediction data that are stored in the on-chip prediction buffer 104 and read from the on-chip prediction buffer 104 as input data of CIIP will be overwritten by the reconstructed data that are output data of CIIP. Hence, no extra storage space is occupied by the reconstructed data output from CIIP.

Although both of the inter prediction module 108 and the intra prediction module 110 are able to perform inter intra blending according to the embodiments shown in FIGS. 5-6, the present invention is not limited thereto. For example, the blending module (not shown) can only be implemented in the inter prediction module 108, and the intra prediction module 110 may send the intra prediction data to the inter prediction module 108 for blending. Similarly, the blending module can only be the intra prediction module 110, and the inter prediction module 108 may send the inter prediction data to the intra prediction module 110 for blending.

Figure 7:
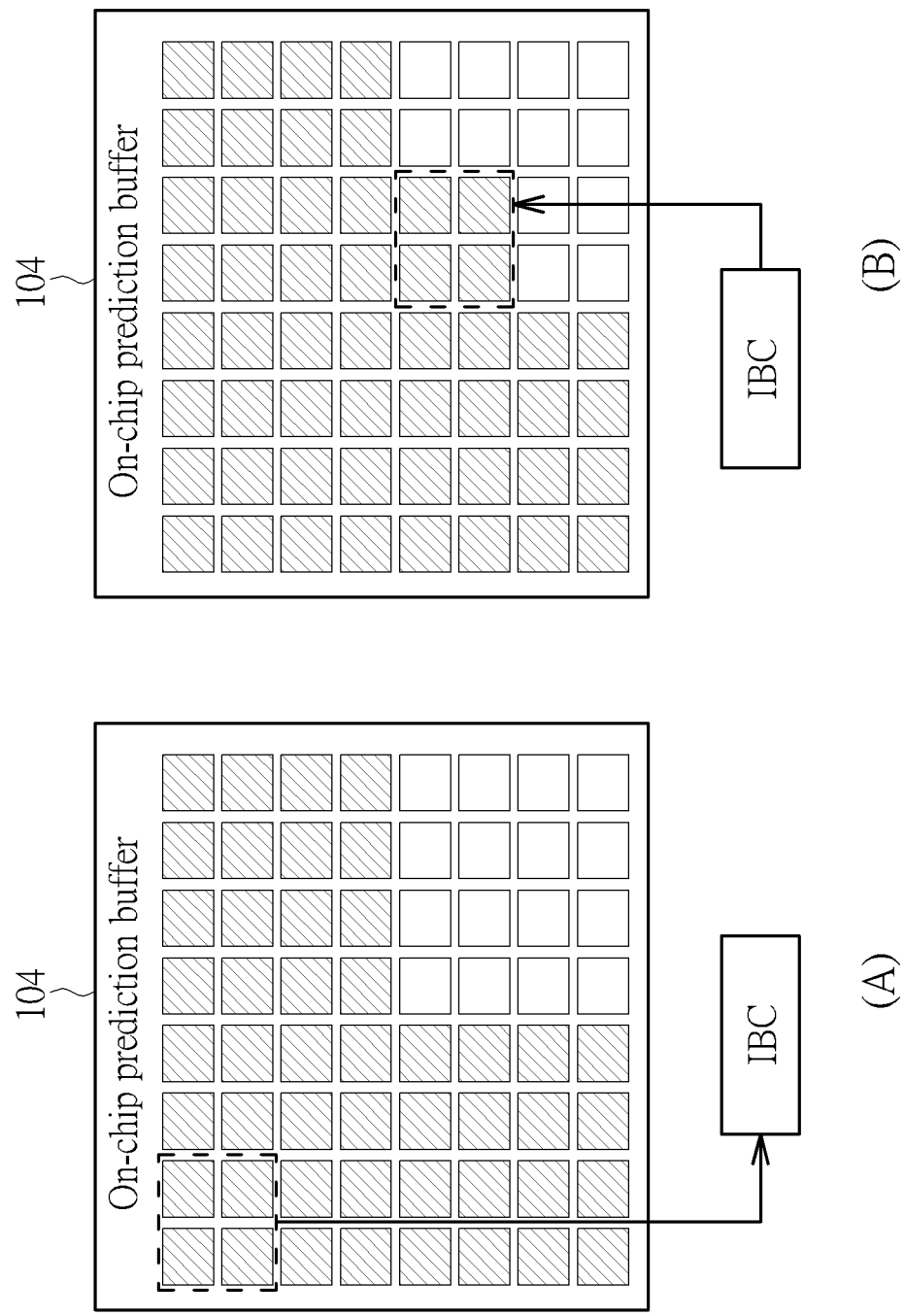
FIG. 7 is a diagram illustrating data transfer between the processing circuit and the on-chip prediction buffer under the IBC mode according to an embodiment of the present invention.

FIG. 7 is a diagram illustrating data transfer between the processing circuit 102 and the on-chip prediction buffer 104 under the IBC mode according to an embodiment of the present invention. The IBC will read a previous reconstructed block which may come from intra prediction or inter prediction. As shown in sub-diagram (A) of FIG. 7, the processing circuit 102 (particularly, intra prediction module 110 of processing circuit 102) reads reconstructed data of the previous block from the on-chip prediction buffer 104 to act as reconstructed data of the current block. As shown in sub-diagram (B) of FIG. 7, the processing circuit 102 (particularly, intra prediction module 110 of processing circuit 102) writes reconstructed data of the previous block (which are output data of IBC) into the on-chip prediction buffer 104. It should be noted that, to support VVC IBC, a buffer size of the on-chip prediction buffer 104 has to be larger than 4×64×64×1.5 pixels (4:2:0) or 4×64×64×2 pixels (4:2:2).

In some embodiments of the present invention, reference data stored in the on-chip prediction buffer 104 are used by one coding tool enabled by the processing circuit 102, and are reused by another coding tool enabled by the processing circuit 102. For example, if the required reference data positions of CCLM, MRLP, CIIP and IBC are the same, the same reference data stored in the on-chip prediction buffer 104 can be reused. In other words, the on-chip prediction buffer 104 does not need to store duplicate reference data for different coding tools (e.g. CCLM, MRLP, CIIP and IBC). In this way, the size of the on-chip prediction buffer 104 can be reduced. For example, the size of the on-chip prediction buffer 104 may be less than ½ picture size.

In some embodiment, the video processing apparatus 100 may include a control circuit (not shown) communicating to the processing circuit 102 and the on-chip prediction buffer 104. The control circuit makes sure the prediction data will not be overwritten until the prediction data are reused by other coding tool. For example, the control circuit may send a first signal, indicating that the prediction data is read-only, to the on-chip prediction buffer 104 to make sure the prediction data is available to other coding tool. Once the control circuit receives a second signal, indicating that the prediction data is not required anymore, from the processing circuit, the control circuit sends a third signal, indicating that the prediction data can be overwritten, to the on-chip prediction buffer 104 so that no extra storage space is occupied by the prediction data that is not required anymore.

In some embodiments of the present invention, any reference data required by multiple coding tools (e.g. CCLM, MRLP, CIIP and IBC) is only read from the on-chip prediction buffer 104 by the processing circuit 102. Since the latency of the on-chip prediction buffer 104 (which is an internal buffer of video processing apparatus 100) is much lower than the latency of the off-chip memory (e.g. DRAM 20 that is external to video processing apparatus 100), the processing latency and performance of the multiple coding tools (e.g. CCLM, MRLP, CIIP and IBC) can be improved.

Regarding the embodiment shown in FIG. 1, the on-chip prediction buffer 104 is coupled to the off-chip memory (e.g. DRAM 20) external to the video processing apparatus 100. The on-chip prediction buffer 104 is further arranged to output the stored reconstructed data to the off-chip memory (e.g. DRAM 20). The post-processing circuit 106 includes one or more in-loop filters, and is arranged to apply post-processing (e.g. in-loop filtering) to reconstructed data read from the off-chip memory (e.g. DRAM 20). In this embodiment, the post-processing circuit 106 does not apply post-processing to any reconstructed data of a frame until all reconstructed data of the frame are available in the off-chip memory (e.g. DRAM 20). In other words, the architecture shown in FIG. 1 is frame-based architecture. However, this is for illustrative purposes only, and is not meant to be a limitation of the present invention.

Figure 8:
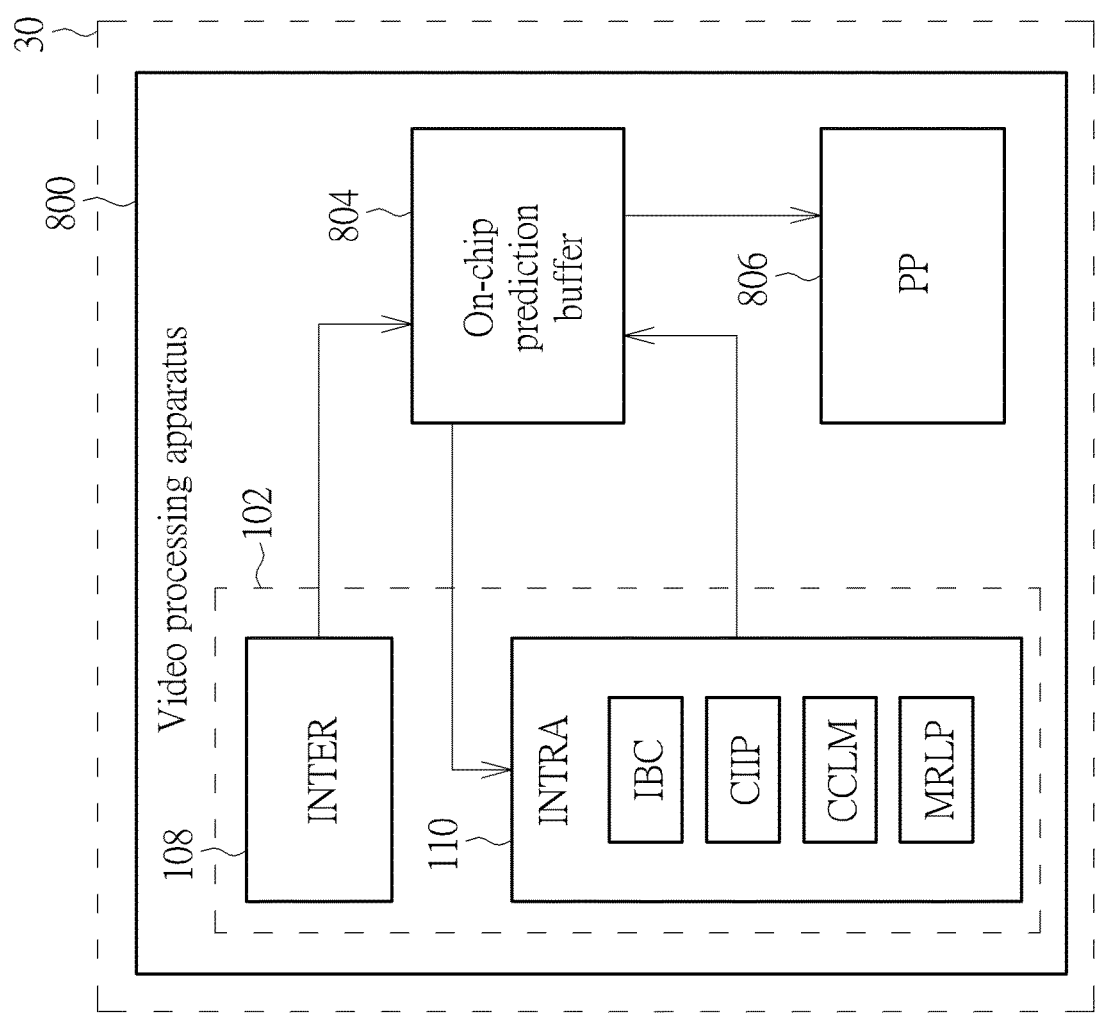
FIG. 8 is a diagram illustrating a second video processing apparatus according to an embodiment of the present invention.

FIG. 8 is a diagram illustrating a second video processing apparatus according to an embodiment of the present invention. The video processing apparatus 800 may be apart of a VVC encoder/decoder. However, this is for illustrative purposes only, and is not meant to be a limitation of the present invention. In practice, any video encoder/decoder using the architecture proposed by the present invention falls within the scope of the present invention. The major difference between the video processing apparatuses 100 and 800 is that the video processing apparatus 800 implemented in a chip 30 has an on-chip prediction buffer 804 coupled to a post-processing circuit (labeled by "PP") 806. Specifically, no DRAM is coupled to the on-chip prediction buffer 804. Hence, the on-chip prediction buffer 804 does not need to output its stored reference data to a DRAM. Like the on-chip prediction buffer 104, the on-chip prediction buffer 804 is an internal buffer shared by multiple coding tools for prediction (e.g. two or more of intra prediction tools, including BC, CIIP, CCLM, and MRLP), and is arranged to store reference data. The on-chip prediction buffer 804 is not a DRAM, and may be implemented by, for example, an SRAM. In this embodiment, the post-processing circuit 806 includes one or more in-loop filters, and is arranged to apply post-processing (e.g. in-loop filtering) to reconstructed data read from the on-chip prediction buffer 804, wherein the post-processing circuit 806 starts to apply post-processing to reconstructed data of a frame before all reconstructed data of the frame are generated from the processing circuit 102. For example, the architecture shown in FIG. 8 is block-based architecture.

Regarding hardware implementation of the above embodiments shown in FIG. 1 and FIG. 8, the multiple coding tools (e.g. CCLM, MRLP, CIIP and IBC) are all fulfilled in the intra prediction module 110 of the processing circuit 102. Alternatively, the IBC (which includes a copy function) and/or CIIP (which includes a blending function) may be fulfilled in the inter prediction module. To put it simply, from the perspective of hardware implementation, IBC and/or CIIP can be fulfilled in an inter prediction module or an intra prediction module.

Figure 9:
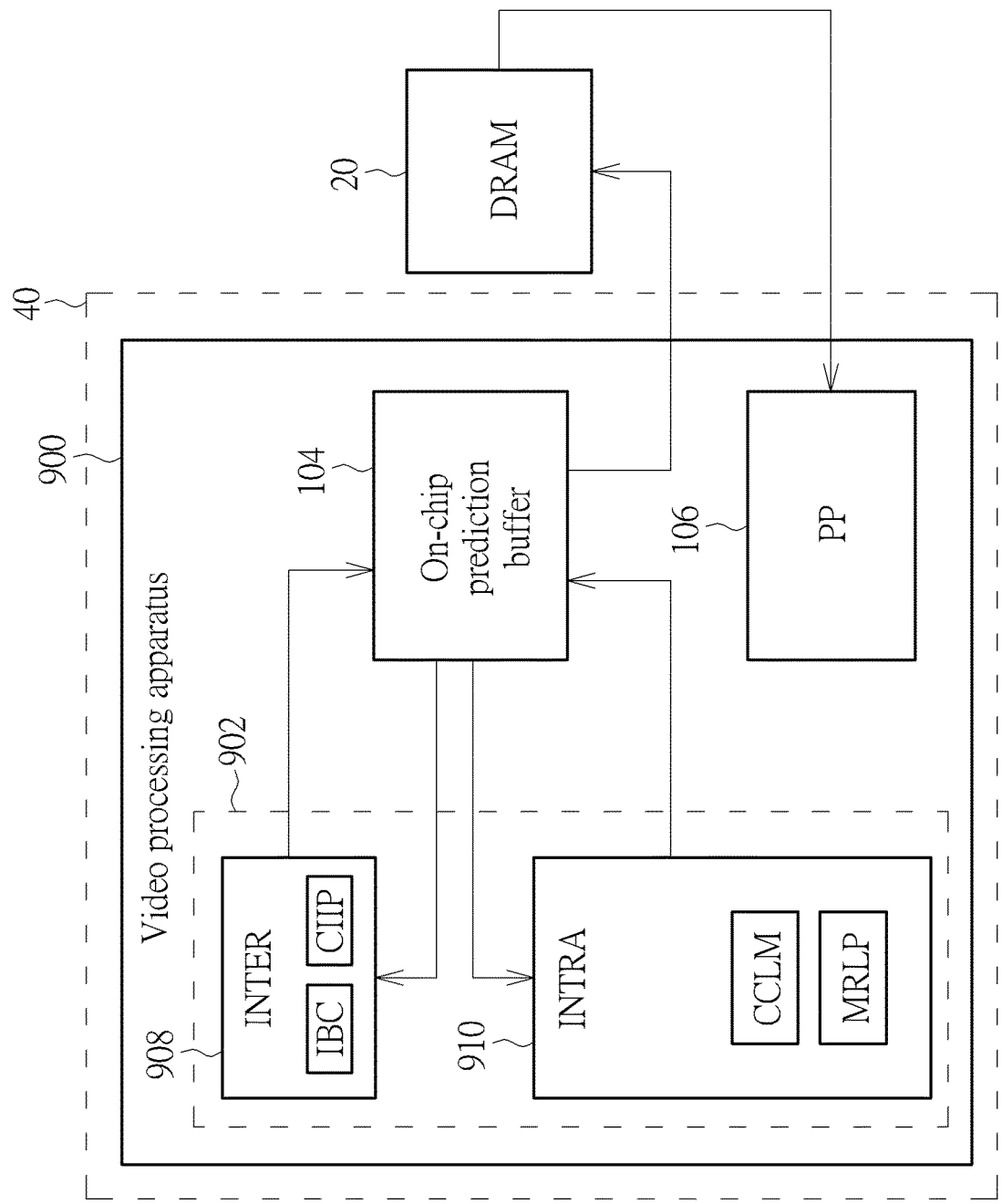
FIG. 9 is a diagram illustrating a third video processing apparatus according to an embodiment of the present invention.

FIG. 9 is a diagram illustrating a third video processing apparatus according to an embodiment of the present invention. The video processing apparatus 900 may be a part of a VVC encoder/decoder. However, this is for illustrative purposes only, and is not meant to be a limitation of the present invention. In practice, any video encoder/decoder using the architecture proposed by the present invention falls within the scope of the present invention. The major difference between the video processing apparatuses 100 and 900 is that the video processing apparatus 900 implemented in a chip 40 has a processing circuit 902 including an inter prediction module (labeled by "INTER") 908 responsible for dealing with IBC and CIIP and an intra prediction module (labeled by "INTRA") 910 responsible for dealing with CCLM and MRLP. Since a person skilled in the art can readily understand details of the video processing apparatus 900 after reading above paragraphs, further description is omitted here for brevity.

Figure 10:
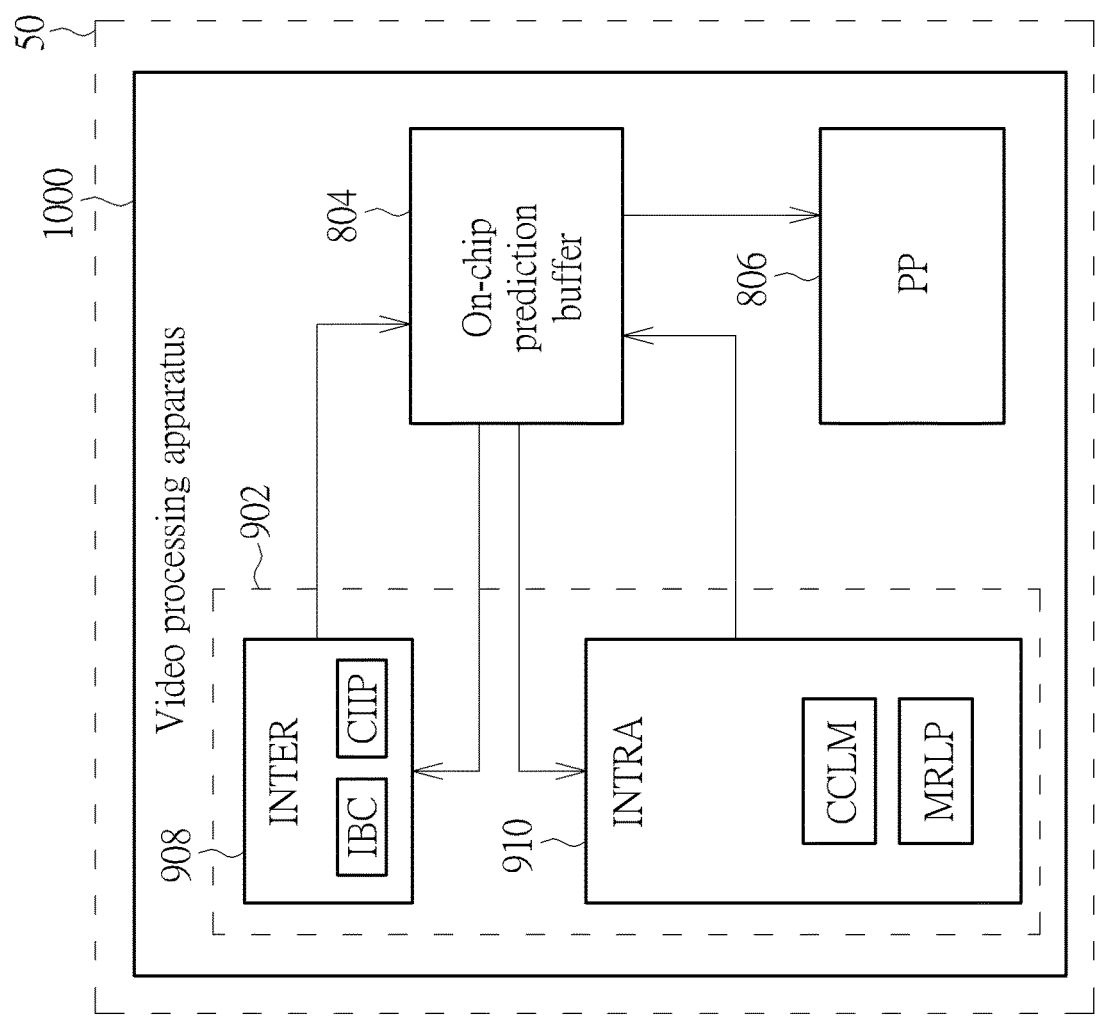
FIG. 10 is a diagram illustrating a fourth video processing apparatus according to an embodiment of the present invention.

FIG. 10 is a diagram illustrating a fourth video processing apparatus according to an embodiment of the present invention. The video processing apparatus 1000 may be apart of a VVC encoder/decoder. However, this is for illustrative purposes only, and is not meant to be a limitation of the present invention. In practice, any video encoder/decoder using the architecture proposed by the present invention falls within the scope of the present invention. The major difference between the video processing apparatuses 800 and 1000 is that the video processing apparatus 1000 implemented in a chip 50 has the processing circuit 902 shown in FIG. 9. Since a person skilled in the art can readily understand details of the video processing apparatus 1000 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing apparatus implemented in a chip, comprising:
an on-chip prediction buffer, shared by a plurality of coding tools for prediction, and arranged to store reference data; and
a processing circuit, arranged to support the plurality of coding tools for prediction, read a plurality of first reference data from the on-chip prediction buffer as input data of a first coding tool that is included in the plurality of coding tools and enabled by the processing circuit, write output data of the first coding tool enabled by the processing circuit into the on-chip prediction buffer as a plurality of second reference data, read a plurality of third reference data from the on-chip prediction buffer as input data of a second coding tool that is included in the plurality of coding tools and enabled by the processing circuit, and write output data of the second coding tool enabled by the processing circuit into the on-chip prediction buffer as a plurality of fourth reference data.

2. The video processing apparatus of claim 1, wherein the plurality of first reference data stored in the on-chip prediction buffer are used by the first coding tool enabled by the processing circuit, and are reused by the second coding tool enabled by the processing circuit.

3. The video processing apparatus of claim 1, wherein any reference data required by the plurality of coding tools is only read from the on-chip prediction buffer by the processing circuit.

4. The video processing apparatus of claim 1, wherein the plurality of coding tools comprise a plurality of intra prediction tools.

5. The video processing apparatus of claim 4, wherein the plurality of intra prediction tools comprise at least two of intra block copy (IBC), combined inter intra prediction (CIIP), cross-component linear model (CCLM), and multiple reference line prediction (MRLP).

6. The video processing apparatus of claim 1, wherein the reference data stored in the on-chip prediction buffer comprise prediction data and reconstructed data.

7. The video processing apparatus of claim 1, wherein the reference data stored in the on-chip prediction buffer comprise intra prediction data and inter prediction data.

8. The video processing apparatus of claim 1, wherein the reference data stored in the on-chip prediction buffer comprise intra reconstructed data and inter reconstructed data.

9. The video processing apparatus of claim 1, wherein the reference data stored in the on-chip prediction buffer comprise reconstructed data, the video processing apparatus is coupled to an off-chip memory, the on-chip prediction buffer is further arranged to output the reconstructed data to the off-chip memory, and the video processing apparatus further comprises:

a post-processing circuit, arranged to apply post-processing to reconstructed data read from the off-chip memory, wherein the post-processing circuit does not apply post-processing to any reconstructed data of a frame until all reconstructed data of the frame are available in the off-chip memory.

10. The video processing apparatus of claim 1, wherein the reference data stored in the on-chip prediction buffer comprise reconstructed data, and the video processing apparatus further comprises:

a post-processing circuit, arranged to apply post-processing to reconstructed data read from the on-chip prediction buffer, wherein the post-processing circuit starts to apply post-processing to reconstructed data of a frame before all reconstructed data of the frame are generated from the processing circuit.

11. A video processing apparatus comprising:

a prediction buffer, shared by a plurality of coding tools for prediction, and arranged to store reference data, wherein the prediction buffer is not a dynamic random access memory (DRAM); and a processing circuit, arranged to support the plurality of coding tools for prediction, read a plurality of first reference data from the prediction buffer as input data of a first coding tool that is included in the plurality of coding tools and enabled by the processing circuit, write output data of the first coding tool enabled by the processing circuit into the prediction buffer as a plurality of second reference data, read a plurality of third reference data from the prediction buffer as input data of a second coding tool that is included in the plurality of coding tools and enabled by the processing circuit, and write output data of the second coding tool enabled by the processing circuit into the prediction buffer as a plurality of fourth reference data.

12. The video processing apparatus of claim 11, wherein the plurality of first reference data stored in the prediction buffer are used by the first coding tool enabled by the processing circuit, and are reused by the second coding tool enabled by the processing circuit.

13. The video processing apparatus of claim 11, wherein any reference data required by the plurality of coding tools is only read from the prediction buffer by the processing circuit.

14. The video processing apparatus of claim 11, wherein the plurality of coding tools comprise a plurality of intra prediction tools.

15. The video processing apparatus of claim 14, wherein the plurality of intra prediction tools comprise at least two of intra block copy (IBC), combined inter intra prediction (CIIP), cross-component linear model (CCLM), and multiple reference line prediction (MRLP).

16. The video processing apparatus of claim 11, wherein the reference data stored in the prediction buffer comprise prediction data and reconstructed data.

17. The video processing apparatus of claim 11, wherein the reference data stored in the prediction buffer comprise intra prediction data and inter prediction data.

18. The video processing apparatus of claim 11, wherein the reference data stored in the prediction buffer comprise intra reconstructed data and inter reconstructed data.

19. The video processing apparatus of claim 11, wherein the reference data stored in the prediction buffer comprise reconstructed data, the video processing apparatus is coupled to the DRAM, the prediction buffer is further arranged to output the reconstructed data to the DRAM, and the video processing apparatus further comprises:

a post-processing circuit, arranged to apply post-processing to reconstructed data read from the DRAM, wherein the post-processing circuit does not apply post-processing to any reconstructed data of a frame until all reconstructed data of the frame are available in the DRAM.

20. The video processing apparatus of claim 11, wherein the reference data stored in the prediction buffer comprise reconstructed data, and the video processing apparatus further comprises:

a post-processing circuit, arranged to apply post-processing to reconstructed data read from the prediction buffer, wherein the post-processing circuit starts to apply post-processing to reconstructed data of a frame before all reconstructed data of the frame are generated from the processing circuit.

* * * * *